Jan. 10, 1967    HANS-JOACHIM LIPPMANN ETAL    3,297,866
MAGNETICALLY TRANSMITTING CONTROL SIGNALS TO VEHICLES
Filed Sept. 15, 1961    2 Sheets-Sheet 1

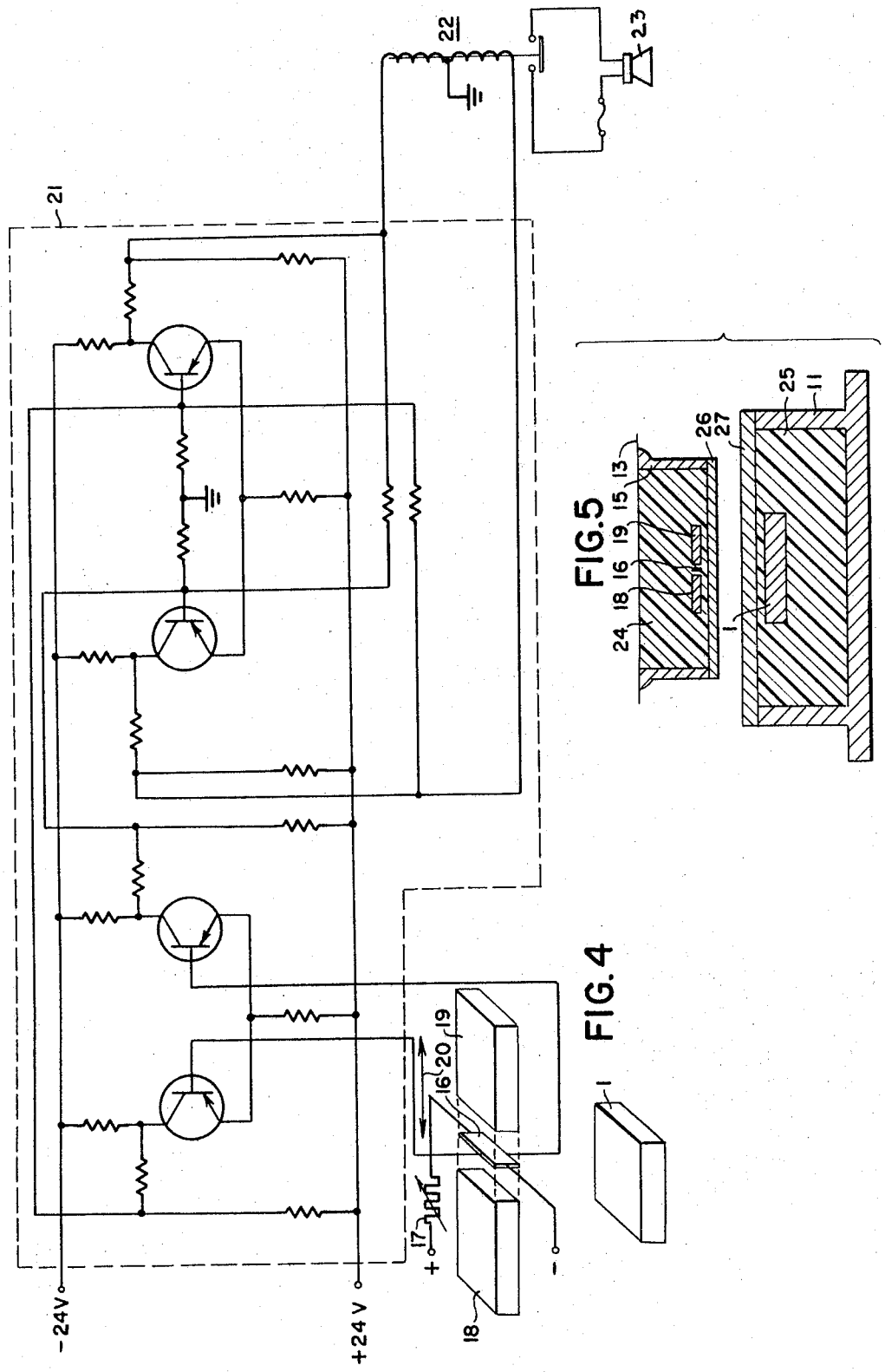

United States Patent Office 3,297,866
Patented Jan. 10, 1967

3,297,866
MAGNETICALLY TRANSMITTING CONTROL
SIGNALS TO VEHICLES
Hans-Joachim Lippmann and Friedrich Kuhrt, both of
Nurnberg, Germany, assignors to Siemens-Schuckert-
werke Aktiengesellschaft, Berlin-Siemensstadt, Ger-
many, a corporation of Germany
Filed Sept. 15, 1961, Ser. No. 138,361
Claims priority, application Germany, Sept. 16, 1960,
S 70,384
3 Claims. (Cl. 246—63)

Our invention relates to a system for transmitting control signals to a receiver on a vehicle having a given travel path, particularly a rail vehicle, from one or more transmitters mounted at fixed locations, for example along the track, or on other vehicles.

In the operation of rail vehicles, for example railroads, it is often desired that when a vehicle or train passes through a given track section, a signal be automatically transmitted from the track to the travelling train. Used for such signal transmission have been magnetic fields in cases where an electrically conducting connection between transmitter and receiver could not be produced or was undesirable. In a known system of this type, the transmitter causes a signal receiver on the vehicle to generate or vary an electric voltage by the effect of the magnetic field upon the electric charge carriers in a semiconductor member. Such a galvano-magnetic device can be equipped with a so-called Hall-voltage generator. A Hall generator comprises a plate or wafer of semiconductor material which, during operation, is traversed by an electric current and which furnishes an output voltage (Hall voltage) between two probe electrodes (Hall electrodes) located on opposite wafer sides midway between the current supply terminals. The Hall voltage is zero when no magnetic field is effective. When the Hall plate is traversed by a magnetic field, the Hall voltage has a magnitude and polarity depending upon the intensity and polarity of the magnetic field at the location of the Hall plate. Due to the polarizing action of the field upon the Hall voltage, a polarized relay can be controlled by the Hall generator.

It is an object of our invention to provide a signal transmitting system of utmost simplicity and reliable operation that is capable of transmitting a signal to a vehicle or train, particularly when the vehicle enters in a given track section, and to then maintain the signal effective until the vehicle passes by another transmitter, for example when it leaves the track section and receives another signal that operates to clear the receiver from the signal received from the first transmitter.

Another object of our invention is to devise a vehicular signal transmission system capable of securing the above-described performance in both travelling directions in the same manner. That is, when the signal transmission is used for issuing a signal to a rail vehicle when it enters a track section and to clear the signal when the vehicle leaves the track section, this same performance is to be secured regardless of whether the vehicle travels in one or the other direction through the section.

In order to attain these objects, our invention utilizes the above-mentioned principle, known as such, of providing on the vehicle a receiver whose magnetic-field responsive sensor is either a Hall generator or another galvano-magnetically operating semiconductor member of equivalent performance. The latter member may consist of a resistance wafer connected in a bridge circuit and changing its ohmic resistance under the effect of the magnetic field stemming from the transmitter so as to provide across the output diagonal of the bridge a voltage whose magnitude and polarity depend upon the intensity and polarity of the transmitter field. It is essential that when using a Hall-generator or other galvano-magnetic device as the sensing element in the receiver, this receiver does not respond to changes of the magnetic field as is the case with inductive electric devices, but rather responds directly to the presence of a magnetic field and the polarity of this field.

Now according to a feature of our invention, we provide at least two transmitters which have the same or an equivalent design and are arranged in symmetric relation to each other along the travel path of the vehicle, whereas the permanent magnets or electromagnets of the respective receivers are given magnetically opposed orientation. These two transmitters are mounted stationarily along the travel path or trackway, or they are mounted on other vehicles travelling on parallel paths or tracks. Furthermore, the receiver mounted on the vehicle for response to to the above-mentioned transmitters, comprises a bistable switching device which is controlled by the above-mentioned galvano-magnetic member, preferably a Hall generator, so as to be triggered from one to its other condition or position and vice versa by sequential response to the magnetic fields of the two transmitters. The bistable switching device is preferably an electronic circuit comprising, for example, a transistor flip-flop amplifier.

Due to the mutually opposed orientation of the magnets in the two otherwise equivalent transmitters, the signal issuing therefrom to the receiver on the vehicle comes about in substantially the same manner and is also cleared in the same manner, irrespective of from which direction the vehicle approaches the track or path section at which the transmitters are located. Such signals can be used with rail vehicles for a variety of purposes. For example, when the vehicle enters into a curve, the signal received from the transmitter may serve to direct the rotatable wheeled trucks of the locomotive or driving car and of any other car of a train into the curve, in order to reduce the dynamic impact and the resulting wear at the running-wheel rims. Such signals may also serve to automatically indicate on the driving car the occurrence of dangerous track sections, for example grade crossings or track sections where construction work is being done; and if desired the signal may also automatically initiate braking of the train. Another use of such signals is to automatically switch on the lighting on the train when it passes into a tunnel and to turn the lights off when the train leaves a tunnel.

At the track section to be equipped with signalling devices, the transmitters may simply be formed by mounting at the beginning of the section a flat bar magnet in a given magnetic orientation, for example so that its north pole points upwardly, and by mounting at the end of the track section another transmitter whose flat-bar magnet has its south pole pointing upwardly. The sequence of the magnetic poles may be reversed, but the pole sequence must always alternate. Then, if the vehicle is located on the track section between the two transmitters, a continuous signal is maintained during the entire travel period, for example the relay is kept in picked-up condition or an electronic switching stage is kept switched on, and the relay or electronic switching circuit is reset only when the vehicle leaves the track section and receives the second signal pulse of the opposed magnetic polarity.

The transmitters are preferably protected from mechanical damage by a suitable enclosure. It is merely necessary to take care that the enclosures or housings consist of non-magnetizable material at those locations where the magnetic fields are to issue to the outside. It is particularly favorable to embed the magnets in a suitable casting resin.

The invention will be further described with reference to the embodiment of a vehicular signalling system according to the invention illustrated by way of example in the accompanying drawings, in which:

FIG. 4 is a schematic circuit diagram of the receiver; and

FIG. 5 is a cross section through one of the transmitters and through the receiver.

Figure 1:
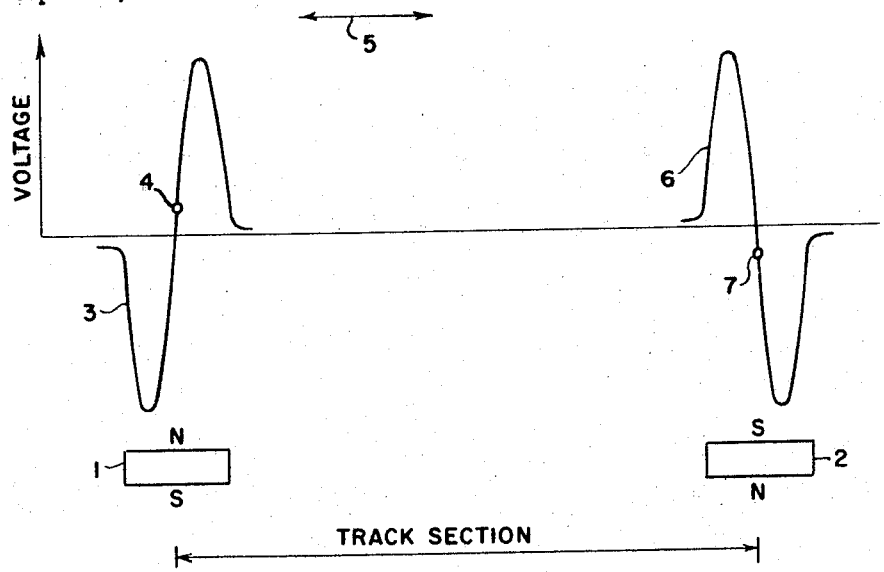
FIGS. 1 and 2 are explanatory graphs representing voltage versus travel distance along a track section, FIG. 1 relating to travel from the left to the right and FIG. 2 to travel in the reverse direction.
Figure 2:
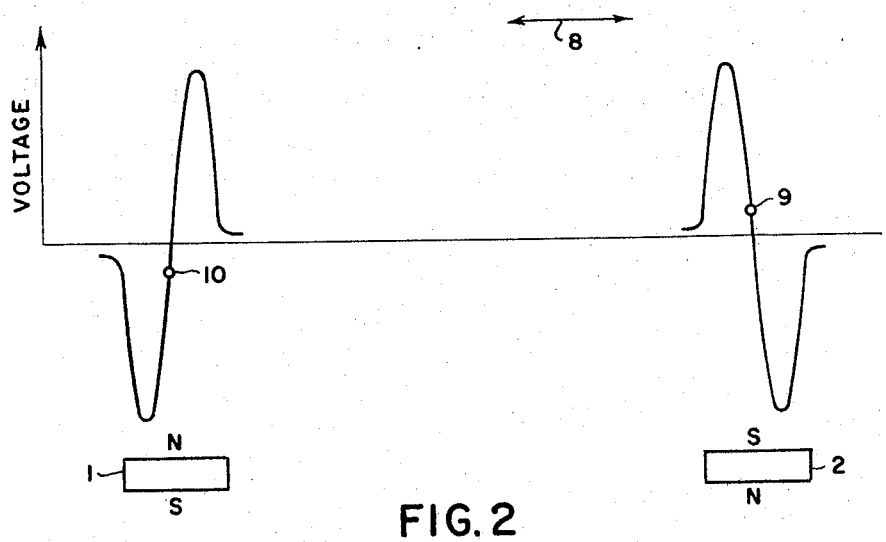
Figure 3:
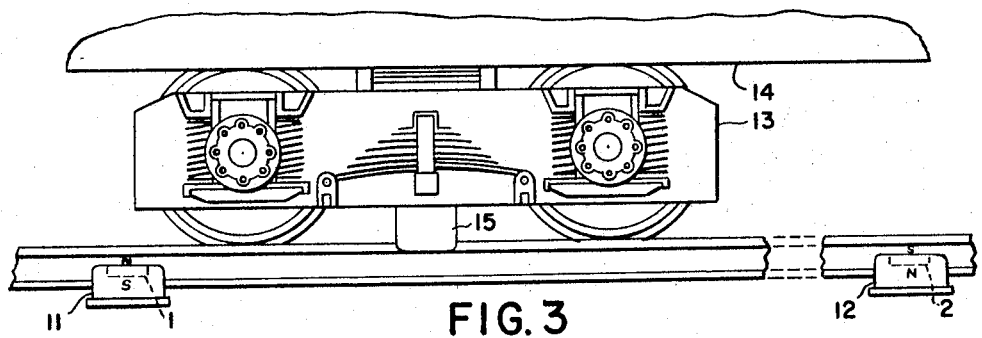
FIG. 3 illustrates schematically two signal transmitters mounted along a track and a signal receiver mounted on the truck of a rail vehicle.

As illustrated in FIGS. 1, 2 and 3, two transmitters are mounted at the respective ends of a track section. The transmitter at the left end of the track section consists essentially of a flat bar magnet 1 whose north pole N points upwardly (FIGS. 1, 2), whereas the corresponding flat magnet 2 at the right end of the section has its south pole S directed upwardly. The two bar magnets 1 and 2 are mounted in respective housings 11 and 12 suitably fastened to the track. The receiver on the vehicle, enclosed in a housing 15 which according to FIG. 3 is mounted on the truck 13 of the vehicle 14, comprises as its sensing element a Hall generator whose design and performance will be described below with reference to FIG. 4. Such a Hall generator responds to the magnitude and magnetic orientation of a magnetic field irrespective of the speed and travelling direction and hence also provides an output (Hall) voltage at standstill of the vehicle.

In FIG. 4, one of the transmitter magnets is shown at 1 in active relation to the Hall generator of the receiver. The Hall generator comprises a semiconductor plate or wafer 16, consisting for example, of indium antimonide or indium arsenide, which is supplied with constant control current through an adjustable resistor 17 from a suitable source (not shown) of direct current. The Hall plate 16 is located in a gap between two pole shoes 18 and 19. The width of the gap is shown exaggerated in FIG. 4. In reality, the planar pole faces of pole shoes 18 and 19 virtually touch the Hall plate 16 but are electrically insulated therefrom. For that purpose the pole shoes 18 and 19 may consist of magnetizable but electrically insulating ferrite material. An arrow 20 in FIG. 4 denotes the two available travelling directions of the receiver.

Connected to the two Hall electrodes of the Hall plate 16, both located on respective opposite edges of the rectangular plate midway between the current supply terminals, are the input leads of a bistable trigger amplifier 21 which may have any suitable design known for such purposes. A two-stage transistor flip-flop circuit as shown in FIG. 4 is particularly well applicable with such a Hall generator. The illustrated transistor amplifier is known and commercially available as such. (For other bistable trigger circuits, suitable for the purposes of the invention, reference may be had, for example, to W. S. Humphrey, Switching Circuits, 1958, page 10; or R. F. Shea, Transistor Circuits, 1953, pages 429, 430.) The output signal of the bistable switching circuit 21 may serve for actuating a signalling device. Illustrated for the purpose of exemplification is an electromagnetic relay 22 which, as long as it is energized, closes the tone-frequency circuit of an acoustic signal device 23. In an analogous manner, any other desired devices can be controlled by a relay or directly from the trigger circuit.

FIG. 5 shows schematically the mounting of the magnet 1 in its housing 21, and the mounting of the magnetizable structures 18, 19 with the Hall plate 16 in the receiver housing 15. It is preferable to embed part 1 as well as parts 18, 19 in casting resin as shown at 25 and 24. In order to obtain mechanically rugged components, the two housings are preferably covered by plates 26, 27 of brass or other non-magnetizable material.

Reverting to FIG. 1, assume that the bistable trigger circuit is in negative condition. As the receiver approaches and passes by the transmitter magnet 1, the Hall voltage of the receiver increases along voltage curve 3 up to a negative maximum and then passes through zero to positive values. As soon as a critical positive value, at point 4 of curve 3 is reached, the trigger circuit snaps to the positive condition and then remains in this stable condition while the vehicle continues travelling during the entire track section in the direction of the arrow 5. When the vehicle now approaches the magnet 2 this second transmitter again causes the generation of a Hall voltage in the receiver. The curve of this Hall voltage is represented at 6 in FIG. 1. Here, however, the orientation of the transmitter magnet is reversed so that the Hall voltage will first assume positive values. Since the trigger circuit is already switched on, its condition is not changed by positive Hall voltage. Hence, only when the Hall voltage declines to the negative range, will the trigger circuit be switched to off condition. This occurs when the voltage reaches the critical negative point 7 of curve 6.

The diagram of FIG. 2 relates to the opposite travelling direction of the vehicle, indicated by the arrow 8. At first the transmitter 2 acts upon the receiver. The Hall voltage then generated in the receiver is first negative and causes no change in the transistor trigger amplifier. However, as soon as the Hall voltage enters into the positive range and reaches a given critical value, for example point 9 of the voltage curve, the amplifier switches to its other stable condition where it remains as the vehicle continues travelling through the entire track section. When ultimately the vehicle enters into the active range of the transmitter 1, the Hall voltage in the receiver is first positive and does not affect the trigger circuit, but when thereafter the negative voltage point 10 is reached, the amplifier is triggered and the signal switched off.

It will be obvious to those skilled in the art, upon studying this disclosure, that our invention permits of various modifications with respect to construction, circuitry, and particular application, and hence can be given embodiments other than particularly illustrated and described herein, without departing from the essential features of our invention and within the scope of the claims annexed hereto.

We claim:

1. A system for magnetically transmitting control signals to a travelling vehicle having a given travel path, comprising at least two transmitters spaced from each other along said path and each comprising a permanent magnet, a receiver on said vehicle having a Hall-voltage generator controllable as to magnitude and polarity of its output voltage by the magnetic fields of said respective transmitter magnets when said receiver passes through proximity thereto, said two magnets being substantially symmetrical but having mutually opposed magnetic orientation relative to said Hall-voltage generator so that said Hall-voltage generator is subjected to opposingly acting field effects at said two transmitters respectively, each of said magnets being positioned with one of its poles facing said receiver and closer to said receiver than its other pole when the receiver is closest to said magnet, each of said magnets being of the same flat configuration with flat pole faces, and said receiver having a bistable trigger circuit connected to receive the output voltage of said Hall-voltage generator to be controlled thereby so that the first response to one of said transmitters issues a signal on the vehicle and the response to the second transmitter clears the signal irrespective of the vehicle speed and travel direction.

2. In a signal transmitter system according to claim 1, each of said transmitters comprising a housing and having its permanent magnet disposed in said housing, and a protective mass of casting resin embedding said magnet in said housing.

3. In a signal transmitter according to claim 1, said Hall-voltage generator of said receiver comprising magnetizable structure having a gap, and a semiconductor Hall plate in said gap, a housing enclosing said Hall-voltage generator, and a mass of casting resin embedding said structure and said Hall plate in said housing.

References Cited by the Examiner

UNITED STATES PATENTS

| | | | |
|---|---|---|---|
| 2,163,520 | 6/1939 | Richards | 246—63 |
| 2,877,394 | 3/1959 | Kuhrt | 324—45 X |
| 2,973,430 | 2/1961 | Pelino | 246—249 |
| 3,041,416 | 6/1962 | Kuhrt. | |

FOREIGN PATENTS

| | | |
|---|---|---|
| 780,190 | 7/1957 | Great Britain. |
| 797,056 | 6/1958 | Great Britain. |
| 823,149 | 11/1959 | Great Britain. |

ARTHUR L. LA POINT, *Primary Examiner.*

J. S. SHANK, LEO QUACKENBUSH, EUGENE G. BOTZ, *Examiners.*

L. J. LEONNING, S. B. GREEN, *Assistant Examiners.*